2,745,815

METHOD AND COMPOSITION FOR THE IMPROVEMENT OF SOIL STRUCTURE

Dorsey R. Mussell, Clare, Mich., assignor to The Dow Chemical Company, Midland, Mich., a corporation of Delaware No Drawing. Application January 2, 1953, Serial No. 329,446

5 Claims. (Cl. 260—37)

This invention is concerned with the conditioning of soils and is particularly directed to an improved soil composition and a method for improving soil structure.

The chemical constitution of the mixture of organic and mineral components which go to make up a soil is not the only determining factor as to whether or not the soil is adapted to tillage operations and the growing of crops. The physical structure of the soil is a further important and frequently determinative factor in soil management. Most unmodified soils have at least some of their individual particles clustered into aggregates. The size distribution of these aggregates, with the resultant size distribution of the pore spaces between them, determines the soil structure.

Soil structure is of importance in the evaluation of soil in areas under cultivation. If there is little or no tendency for soil to aggregate into crumbs, the clay particles of the soil generally disperse rapidly in rain water to form a sticky mud, relatively resistant to further absorption and penetration of water. This results in increased run-off during heavy rains with attendant erosion. Also, the moisture retention properties of such soil are poor. Furthermore, unaggregated soils, on drying, tend to form hard crusts or large clods at the surface and densely consolidated layers (clay hardpan) below the surface.

On the other hand, a soil characterized by having a substantial proportion of the clay particles joined together to form water-stable aggregates will generally absorb incident rainfall rapidly and allow it to percolate down to and into the sub-soil. Such soils are less sticky when wet, show less tendency to compaction and have improved water-holding capacity.

It is an object of the present invention to provide a method for improving the physical condition of soils. Another object is to provide soil compositions characterized by improved friability, better drainage, increased aeration and/or improved water-holding capacity. Other objects will become apparent from the following specification and claims.

According to the present invention, it has been found that water-soluble polymers of ethyleneimine, i. e. polyethyleneimine, when incorporated in soils of poor physical structure at a concentration of at least 0.01 percent by weight of the soil, cause marked improvement in the structure and workability thereof. It is among the advantages of the invention that soils treated as set forth herein remain crumbly and friable even at high moisture content, percolation of rainfall into and through the soil is increased, aeration is improved and the soil has improved water-holding capacity. It is a further advantage that the treated soils show a decreased tendency to puddle when wet, and to crust and crack when dry.

The water-soluble polyethyleneimines are mildly alkaline, hydrophilic substances prepared as described in United States Patents Nos. 2,182,306 and 2,208,095. These materials are commercially available in the form of concentrated aqueous solutions. The particular polyethyleneimines operable in the present invention are characterized by viscosities in aqueous 25 percent by weight solution of at least 20 centistokes and preferably at least 250 centistokes at a temperature of 25° C. as determined with an Ostwald viscosimeter.

In carrying out the invention, an aqueous solution of the polyethyleneimine is intimately dispersed through the soil to any desired depth. This may be accomplished by mechanically mixing the polyethyleneimine with the soil to be conditioned. In another method of operation, the polyethyleneimine may be dissolved in irrigation water and so distributed through the soil. Alternatively the polyethyleneimine may simply be applied to the surface of soil. It is desirable that such application be followed by a discing, dragging or harrowing operation in order to distribute the polyimine as evenly as possible through the desired depth of soil. In such operation, it is frequently preferred that the polyethyleneimine be relatively uniformly dispersed through the upper 3 to 6 inches of the soil. However, depending upon the particular soil characteristics encountered and the results desired, a greater or lesser depth of soil may be treated.

In yet another mode of operation, the polyethyleneimine may be applied to a relatively thin cross-section of the soil. For example, where the principal object is to aid the emergence of a crop by preventing the formation of a hard crust, only the upper ¼ to 1 inch of the soil may be treated. Similarly, with localized problems such as plowsole hardpans, the polyethyleneimine may be distributed in the bottom of the furrow immediately following the plow.

Concentrated aqueous solutions of polyethyleneimine, such as are encountered in commerce, may be diluted with water to facilitate application. Good results are obtained when employing aqueous solutions containing from about 1 to 10 percent by weight of polyethyleneimine although any desired concentration may be employed provided only that it has such characteristics as to permit distribution over and through the soil.

Alternatively the preparation of polyethyleneimine solutions for application may be accomplished with aqueous solutions of water-soluble fertilizers as the diluent. In such operations solutions of ammonia, ammonium sulfate, sodium nitrate, liquid manure extract and the like may advantageously be employed, a single application then serving for the placement of both soil conditioner and fertilizer. In a preferred embodiment, the polyethyleneimine is partly or wholly neutralized with one or more acids such as nitric or phosphoric acid to obtain an aqueous soil conditioning and fertilizing solution. In such solutions the nitrate, phosphate or other anion having nutritive value to plants becomes available as a fertilizer when applied to the soil while the polyethyleneimine performs its function as a soil conditioner without impairment of activity.

The exact amount of polyethyleneimine to be used is dependent upon the type of soil concerned and the specific purposes of the treatment. In general, it is only necessary that sufficient of the polyethyleneimine is employed to accomplish the desired result as regards improvement in the physical condition of the soil, e. g. porosity, moisture retention, degree of aggregation, etc. Desirable results have been obtained when employing the polyethyleneimine in the amount of from about 0.01 to 1.0 percent by weight of the soil. A preferred embodiment of the invention is a composition which comprises soil and in intimate admixture therewith from about 0.02 to 0.5 percent by weight of the polyethyleneimine as described above.

In a representative operation, Miami silt loam soil known to be subject to severe compaction and puddling, was air-dried and sieved through a 10-mesh screen. 10 parts by weight of an aqueous 50 percent by weight solution of a polyethyleneimine (having a viscosity of 259 centistokes at 25° C. for an aqueous 25 percent by weight solution) was dissolved in 1000 parts of water and this solution incorporated with thorough mixing in 10,000 parts of the above soil. 300 grams of the treated soil was placed in a standard soil tube having a 1⅞ inch inside diameter and gently tamped to obtain a soil column 6 inches in depth. This column was wetted to saturation and allowed to stand for 72 hours. Thereafter a constant head of water was maintained over the soil column for a period of 24 hours and the total volume of water passing through the column was determined. An untreated portion of the Miami soil was submitted to the same procedure to serve as a check. An average percolation rate of 473 milliliters per hour was obtained for the treated soil as compared to 26 milliliters per hour for the untreated soil. It was further observed that the treated soil was compacted to the extent of only 2 percent when subjected to the above saturation with water whereas, the untreated control compacted to the extent of over 18 percent.

Upon completion of the percolation determination set forth above, the soil samples were allowed to drain for 16 hours and removed from the tubes. A 200 gram portion of the wet soil was placed on a 14-mesh sieve of the Tyler series superimposed on a 32-mesh sieve. The sieve combination was then agitated for a period of about 2 minutes in a tank of water until all of the fine non-aggregated soil was screened out. By this procedure water-stable aggregates having a diameter of 0.5 millimeter or greater were retained on the screens. These aggregates were allowed to drain for 5 minutes and weighed. The soil treated with polyethyleneimine was found to contain 40.5 percent wet weight of aggregates having 0.5 millimeter diameter or greater as compared to 14 percent aggregates in the untreated soil.

In further operations, similar to the above, percolation rates of 100 or greater were obtained with samples of soil of poor physical structure when modified with from 0.01 to 0.3 percent by weight of polyethyleneimine products having viscosities of 20 centistokes and higher for an aqueous 25 percent solution at 25° C.

In a field operation, an aqueous solution containing about 2.5 percent by weight of polyethyleneimine was sprayed with open nozzles by power sprayer over an area of soil at a dosage of 50 gallons per 1000 square feet. The area was thereafter harrowed and dragged to distribute the material through the upper 3 inches of the soil. This application acomplished the distribution of the polyethyleneimine at the rate of about 500 pounds per acre. On subsequent observation during a period of moderate rainfall, it was found that the treated area drained rapidly with little or no puddling and was workable within a relatively short time after the rain. In a subsequent dry period, the treated soil remained friable, retained a desirable moisture content, and was readily cultivated. In contrast, an adjacent untreated area in the same field puddled badly and became water-logged during the rainy period, and became very dry and formed a hard crust during the subsequent dry period.

I claim:

1. A method for the improvement of soil structure which comprises distributing in the soil and in intimate admixture therewith a water-soluble polyethyleneimine, said polyethyleneimine having a viscosity for an aqueous 25 percent solution of at least 20 centistokes at a temperature of 25° C.

2. A method for the improvement of soil structure which comprises distributing in the soil and in intimate admixture therewith at least 0.01 percent by weight of a water-soluble polyethyleneimine, said polyethlyeneimine having a viscosity for an aqueous 25 percent solution of at least 20 centistokes at a temperature of 25° C.

3. A method for the improvement of soil structure which comprises distributing in the soil and in intimate admixture therewith a water-soluble polyethyleneimine, said polyethlyeneimine having a viscosity for an aqueous 25 percent solution of at least 250 centistokes at a temperature of 25° C.

4. A method for the improvement of soil structure which comprises distributing in the soil at least 0.01 percent by weight of a water soluble polyethyleneimine, said polyethyleneimine having a viscosity for an aqueous 25 percent solution of at least 20 centistokes at a temperature of 25° C. and being applied to the soil in the form of an aqueous solution containing from about 1 to 10 percent by weight of the polyethyleneimine.

5. A method according to claim 4 wherein the polyethyleneimine in solution is at least partly neutralized with at least one acid selected from the group consisting of nitric acid and phosphoric acid.

References Cited in the file of this patent

UNITED STATES PATENTS

| | | |
|---|---|---|
| 2,208,095 | Esselmann et al. | July 16, 1940 |
| 2,582,194 | Dudley | Jan. 8, 1952 |
| 2,625,529 | Hedrick, et al. | Jan. 13, 1953 |